G. L. HERZ.
NON-SKID DEVICE FOR TIRES.
APPLICATION FILED DEC. 21, 1915.

1,242,691.

Patented Oct. 9, 1917.

Witness:
Harry G. Fleischer

Inventor:
Gustave L. Herz
by attorneys

UNITED STATES PATENT OFFICE.

GUSTAVE L. HERZ, OF NEW YORK, N. Y.

NON-SKID DEVICE FOR TIRES.

1,242,691. Specification of Letters Patent. Patented Oct. 9, 1917.

Application filed December 21, 1915. Serial No. 68,079.

*To all whom it may concern:*

Be it known that I, GUSTAVE L. HERZ, a citizen of the United States, and resident of the borough of Manhattan, in the city and State of New York, have invented a new and useful Improvement in Non-Skid Devices for Tires, of which the following is a specification.

The object of my invention is to provide a non-skid device for tires which will be very cheap, which may be readily applied and retained in its operative position on the tire, which may be thrown away after it has been used, because of its cheapness, and which may be cut into suitable lengths for tires of different sizes, by the dealer or user.

Practical embodiments of my invention are represented in the accompanying drawings, in which, Figure 1 is a detail side view of a pneumatic tire with one form of non-skid strip applied thereto.

In both of the forms shown, the non-skid device comprises a strip of substantially flat material fitted to retain its operative position on the tire.

The non-skid device is shown as a strip of suitable flat material 1, such, for instance, as a fabric material, the said strip being perforated at intervals and provided with eyelets 2, to increase the life of the strip.

Figure 1:
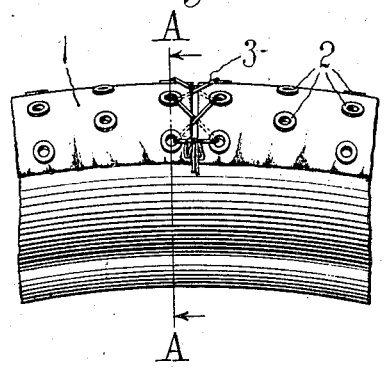
Figure 2:
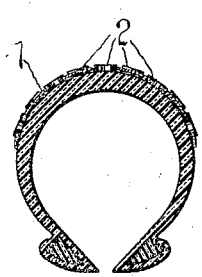
Fig. 2 is a cross section taken in the plane of the line A—A of Fig. 1.
Figure 3:
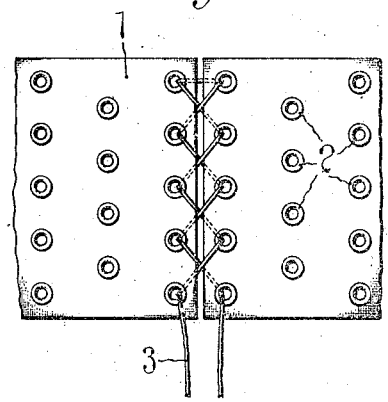
Fig. 3 is a detail plan view of the strip at its meeting ends.

In the form shown in Figs. 1 to 3 inclusive, the meeting ends of the strip are secured together by a lacing cord 3, which may be passed through the adjacent eyelets 2 in the strip.

Figure 4:
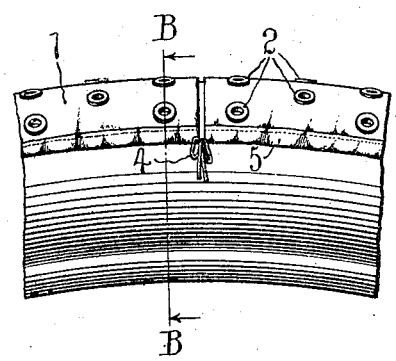
Fig. 4 is a detail side view of a pneumatic tire with a second form of non-skid strip applied thereto.
Figure 5:
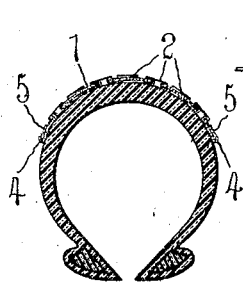
Fig. 5 is a cross section taken in the plane of the line B—B of Fig. 4.
Figure 6:
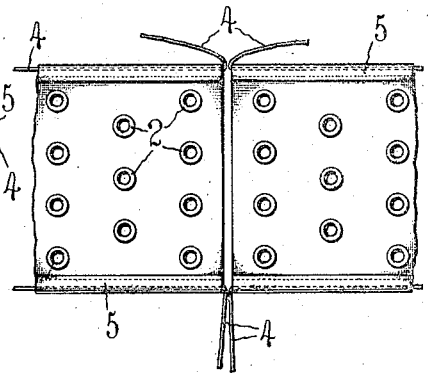
Fig. 6 is a detail plan view of the strip at its meeting ends.

In the form shown in Figs. 4, 5 and 6, cords 4 are shown extending through loops 5 along the side edges of the strip for drawing the sides of the strip within the maximum circumference of the tread and for securing the ends of the strip together to hold the strip in position on the tire. The lacing cord 3 may or may not be used in this form as desired.

It is obvious that the forms above described are only two of many different embodiments of my invention, the object being to provide a non-skid device which will obviate the necessity of putting non-skid chains of the usual type or other expensive non-skid substantially permanent devices on the tire, it being intended that my non-skid device shall be made so cheaply that the device may be discarded as soon as it has served its temporary purpose as a non-skid device for a limited period.

It will also be seen that the non-skid device may be kept in long strips, in the form of rolls for instance, from which long strips shorter strips may be cut by the dealer or user to suit tires of different sizes, thus obviating the necessity of keeping strips of different sizes in stock to suit tires of different sizes.

It is also intended that these strips shall be made of such thin and light material that they will not affect the speed of the car in driving, or require more power to drive the car, as is the case with the usual non-skid devices now in use.

What I claim is:

1. A non-skid device for tires comprising a strip of fabric having eyelets arranged throughout its length to increase its strength and non-skidding effect and to permit its being cut any length to suit any sized tire and to be fastened in position around the tread of the tire by a suitable fastening means.

2. A non-skid device for tires comprising a strip of fabric having eyelets arranged throughout its length to increase its strength and non-skidding effect and to permit its being cut any length to suit any sized tire and to be fastened in position around the tread of the tire by a lacing cord passing through the eyelets which happen to be adjacent to the meeting ends of the strip.

In testimony, that I claim the foregoing as my invention, I have signed my name, this eighth day of December, 1915.

GUSTAVE L. HERZ.

Copies of this patent may be obtained for five cents each, by addressing the "Commissioner of Patents, Washington, D. C."